United States Patent [19]
Ogawa et al.

[11] Patent Number: 5,521,463
[45] Date of Patent: May 28, 1996

[54] CATHODE RAY TUBE HAVING A CANCEL COIL FOR EARTH MAGNETISM

[75] Inventors: Junichi Ogawa; Satoru Nakanishi; Hisashi Iwamoto; Kenji Ebe, all of Kanagawa, Japan

[73] Assignee: Sony Corporation, Tokyo, Japan

[21] Appl. No.: 511,319

[22] Filed: Aug. 4, 1995

Related U.S. Application Data

[63] Continuation of Ser. No. 107,063, Aug. 17, 1993, abandoned.

[30] Foreign Application Priority Data

Aug. 21, 1992 [JP] Japan .................................... 4-222832

[51] Int. Cl.⁶ ................................................. H01J 29/76
[52] U.S. Cl. ..................... 313/440; 313/413; 335/213; 335/299
[58] Field of Search ..................................... 313/440, 402, 313/413, 431, 433; 348/829, 830, 831; 335/210, 213, 296, 299, 225, 284

[56] References Cited

U.S. PATENT DOCUMENTS

| | | | |
|---|---|---|---|
| 4,296,359 | 10/1981 | Dodds | 313/430 X |
| 4,899,082 | 2/1990 | Sands et al. | 313/433 X |
| 4,943,753 | 7/1990 | Hevesi | 313/440 |
| 4,992,697 | 2/1991 | Penninga et al. | 313/440 |
| 5,021,712 | 6/1991 | Sands et al. | 313/433 X |
| 5,170,094 | 12/1992 | Giannantonio et al. | 313/431 |

FOREIGN PATENT DOCUMENTS

| | | | |
|---|---|---|---|
| 6024052 | 7/1983 | Japan | H01J 29/76 |
| 0039840 | 2/1992 | Japan | 313/440 |

Primary Examiner—Sandra L. O'Shea
Assistant Examiner—Ashok Patel
Attorney, Agent, or Firm—Jay H. Maioli

[57] ABSTRACT

Image rotation of a cathode ray tube caused by the influence of earth magnetism can be suppressed. An image rotation correcting coil for generating a magnetic field of the direction opposite to that of a horizontal earth magnetism component of the direction vertical to the picture tube is disposed between a deflection yoke formed at the outside of a tube envelope of a cathode ray tube and an anode button.

2 Claims, 11 Drawing Sheets

FIG. 13A
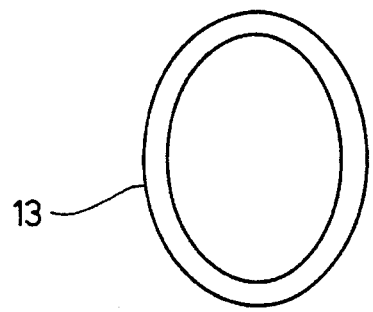
FIG. 13B
FIG. 13E
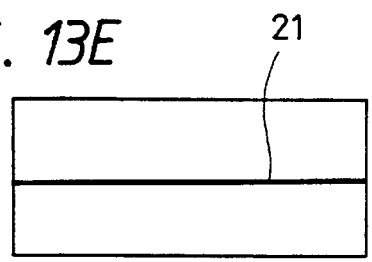
FIG. 13C
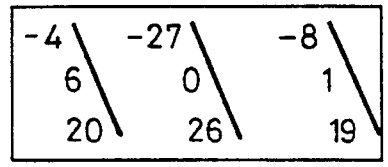
FIG. 13F
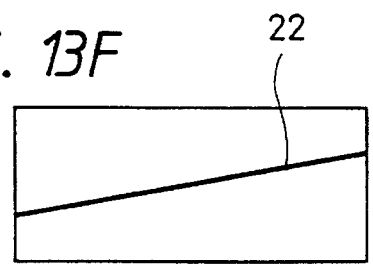
FIG. 13D
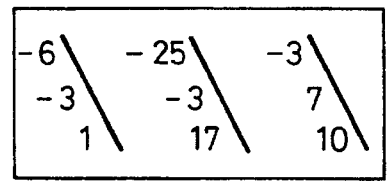
FIG. 13G
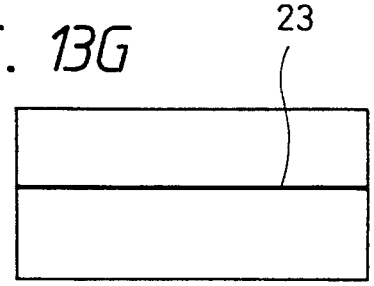

CATHODE RAY TUBE HAVING A CANCEL COIL FOR EARTH MAGNETISM

This is a continuation of application Ser. No. 08/107,063 filed Aug. 17, 1993 now abandoned.

BACKGROUND OF THE INVENTION

1. Field of the Invention

The present invention relates to a cathode ray tube having a cancel coil for an external magnetic field such as earth magnetism or the like.

2. Description of the Prior Art

As shown in FIG. 1 of the accompanying drawings, a color cathode ray tube comprises a tube envelope body 1 of a CRT (cathode ray tube) assembly, a phosphor screen 2 formed on the inner surface of a panel of the tube envelope 1, a color selecting electrode (e.g., aperture grill, shadow mask, etc.) 3 placed opposite the phosphor screen 2 and an electron gun 4 disposed in a necked-down portion of the tube envelope 1. An electron beam 5 emitted from the electron gun 4 is deflected by a deflection yoke 6 at a predetermined period in the horizontal and vertical directions so as to irradiate the phosphor screen 2, whereby the phosphor screen 2 is rendered luminous.

The electron beam 5 deflected by the deflection yoke 6 is affected by various forces of a magnetic field that was formed within the tube envelope 1 by earth magnetism before reaching the phosphor screen 2 so that the electron beam 5 is deviated from its path.

When a color cathode ray tube, for example, is directed in the north and south direction in use, the electron beam 5 is deviated from its path by a horizontal component (in the vertical direction to the picture screen) of earth magnetism in the north and south direction. If the amount that the electron beam 5 is deviated from its path is large, then such amount appears as a phenomenon in which the entirety of a picture screen 10 is rotated. This phenomenon will hereinafter be referred to as an image rotation for simplicity. If such image rotation becomes 0.5 or more at a center angle θ, then such image rotation becomes a nuisance for the viewer.

In order to suppress the influence of the horizontal earth magnetism component, according to the prior art, external peripheral portions of the panel and the funnel portion of the cathode ray tube are surrounded by an external magnetic shield member to magnetically shield the cathode ray tube from the horizontal earth magnetism component or an annular internal magnetic shield member is provided within the tube envelope 1 to magnetically shield the cathode ray tube from the horizontal earth magnetism component.

Further, a degauss coil is provided at one portion outside the tube envelope to degauss magnetic members disposed in and out of the tube envelope.

Present color cathode ray tubes tend to dispense with the external magnetic shield member because the color cathode ray tubes are made large in size but are relatively short.

The internal magnetic shield member, however, is poor in shield characteristic against the north and south horizontal earth magnetism component which considerably contributes to the rotation of the picture as compared with the external magnetic shield member. Therefore, the magnetic shield based on the degauss coil and the internal magnetic shield member has a limit as a countermeasure for preventing the picture from rotating.

On the other hand, as the color cathode ray tube becomes large in size, such as a high definition television cathode ray tube or the like, the amount of image rotation is increased and becomes conspicuous.

OBJECTS AND SUMMARY OF THE INVENTION

Therefore, it is a general object of the present invention to provide an improved cathode ray tube in which the aforesaid shortcomings and disadvantages of the prior art can be eliminated.

It is an object of the present invention to provide a cathode ray tube in which rotation of a picture due to an external magnetic field such as earth magnetism or the like can be suppressed.

It is another object of the present invention to provide a cathode ray tube in which a complex movement due to an external magnetic field can be avoided so that the amount which the electron beam is deviated from its path can be corrected properly.

It is a further object of the present invention to provide a cathode ray tube in which image rotation can be suppressed and the landing position of an electron beam can also be corrected satisfactorily.

According to an aspect of the present invention, there is provided a cathode ray tube which is comprised of a cathode ray tube (CRT) assembly having a funnel, an electron gun for emitting an electron beam, a deflection yoke operating to deflect the electron beam onto a panel combined with the funnel, and a device for generating a magnetic field to cancel an external magnetic field, the device being disposed on the outside of the CRT assembly, thereby eliminating image rotation caused by the external magnetic field.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 13A through 13G are schematic diagrams showing landing patterns for which the electron beam is directed by the image rotation correcting coil of the longitudinally elliptical configuration;

DETAILED DESCRIPTION OF THE PREFERRED EMBODIMENTS

Embodiments of a color cathode ray tube according to the present invention will hereinafter be described with reference to the drawings.

Figure 1:
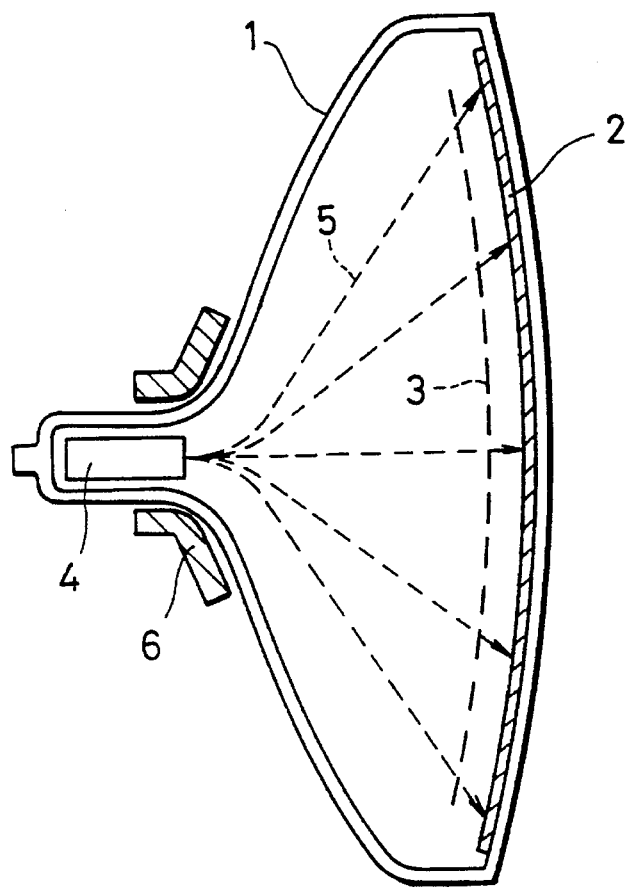
FIG. 1 is a cross-sectional view illustrative of a cathode ray tube.
Figure 2:
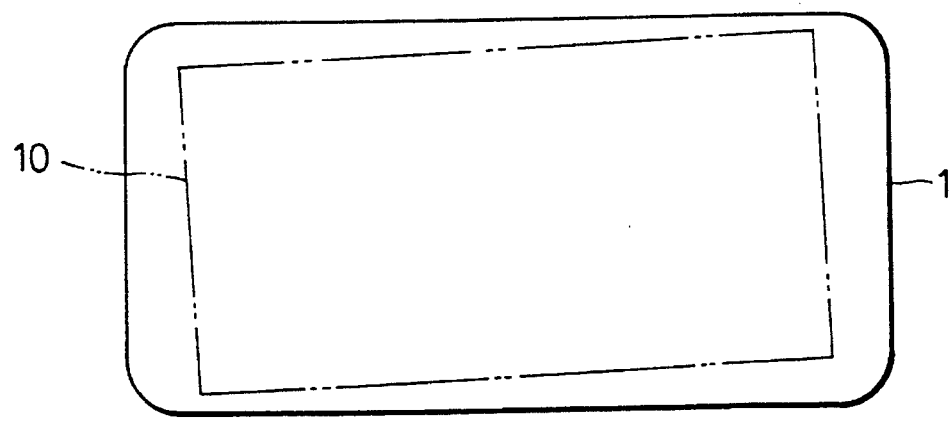
FIG. 2 is a diagram used to explain the condition in which a picture is rotated under influence of earth magnetism in the cathode ray tube.
Figure 3:
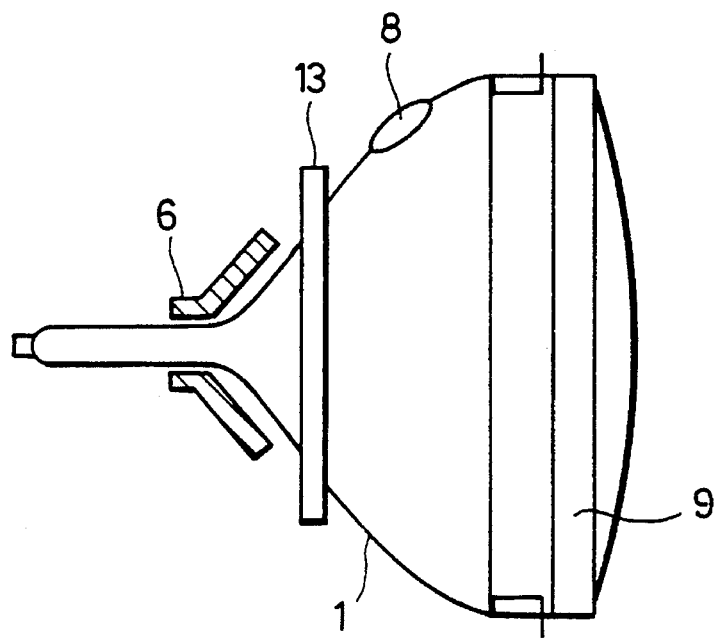
FIG. 3 is a side view illustrating a cathode ray tube according to a first embodiment of the present invention.
Figure 4:
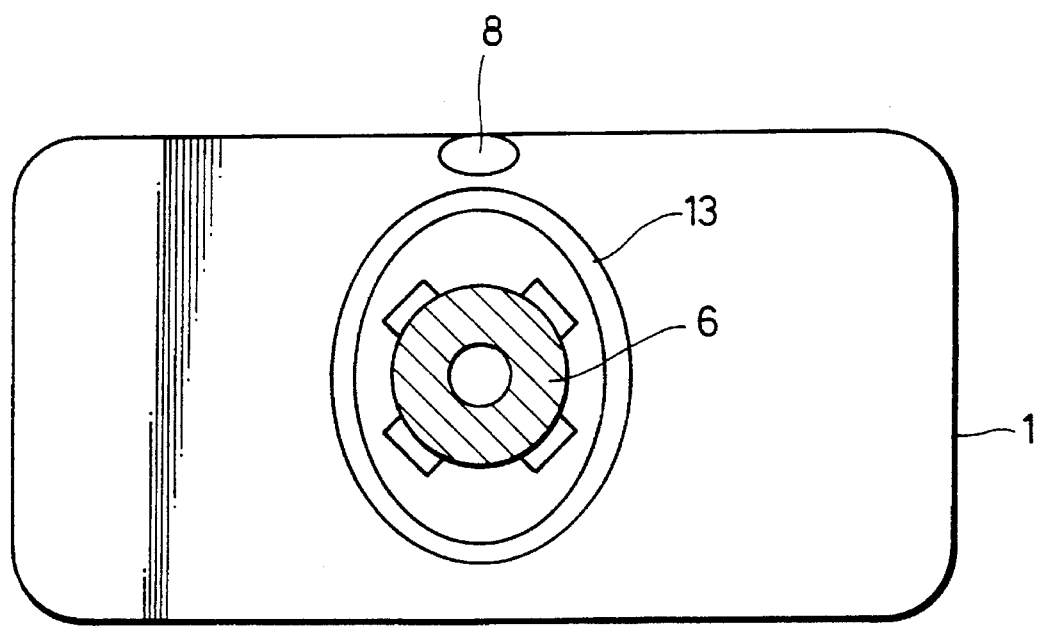
FIG. 4 is a rear view of the cathode ray tube shown in FIG. 3.

FIGS. 3 and 4 show a first embodiment of the present invention. As shown in FIG. 1 there is provided the tube envelope 1 of the CRT assembly. Within the tube envelope 1 of the CRT assembly, the color phosphor screen is deposited on the inner surface of the panel, the color selecting electrode (e.g., aperture grill, shadow mask, etc.) is disposed in an opposing relation to the color phosphor screen, and the electron gun is disposed in the necked-down portion, though not shown. In FIGS. 3 and 4, reference numeral 6 designates a deflection yoke that is used to deflect an electron beam (not shown) in the horizontal and vertical directions, reference numeral 8 designates an anode button which supplies a high voltage to the CRT assembly and reference numeral 9 depicts an anti-explosion band. This color cathode ray tube includes the internal magnetic shield member and the degauss coil, though not shown.

According to this embodiment, on the outside of the funnel portion of the tube envelope 1, particularly, on the portion between the deflection yoke 6 and the anode button 8, there is disposed a magnetic field generating means, i.e., image rotation correcting coil 13 of an annular shape for generating an external magnetic field in the vertical direction relative to the surface of the tube envelope 1, i.e., magnetic field in the opposite direction to the horizontal earth magnetism component such that the coil surface thereof is parallel to the panel surface (so-called picture screen). For the image rotation correcting coil 13, there may be used a coil having a long shape in the longitudinal or vertical direction.

Figure 5:
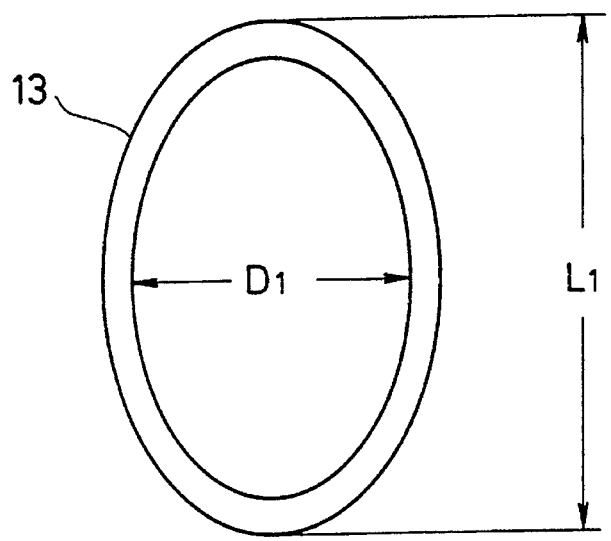
FIG. 5 is a front view showing an example of an image rotation correcting coil having a long shape in the longitudinal direction.

As an example of the image rotation correcting coil 13 having the long shape in the longitudinal direction, there is formed an elliptical coil having a long shape in the longitudinal direction in which a conductor having a diameter of 0.2 mm is wound in 300 turns, a long diameter $L_1$ thereof becomes 280 mm and a short diameter $D_1$ thereof becomes 245 mm, as shown in FIG. 5.

The shape of this image rotation correcting coil 13 is not limited to an ellipse long in the vertical direction and the image rotation correcting coil 13 can be formed of a rectangular coil having a long shape in the vertical direction.

In accordance with this embodiment, when an electric current flows to the image rotation correcting coil 13 to generate a magnetic field in the opposite direction to the magnetic field (i.e., horizontal earth magnetism component in the north and south direction) that is perpendicular to the picture screen, a force opposite to the force caused by the earth magnetism acts on the electron beam, thereby suppressing the image rotation.

Figure 6:
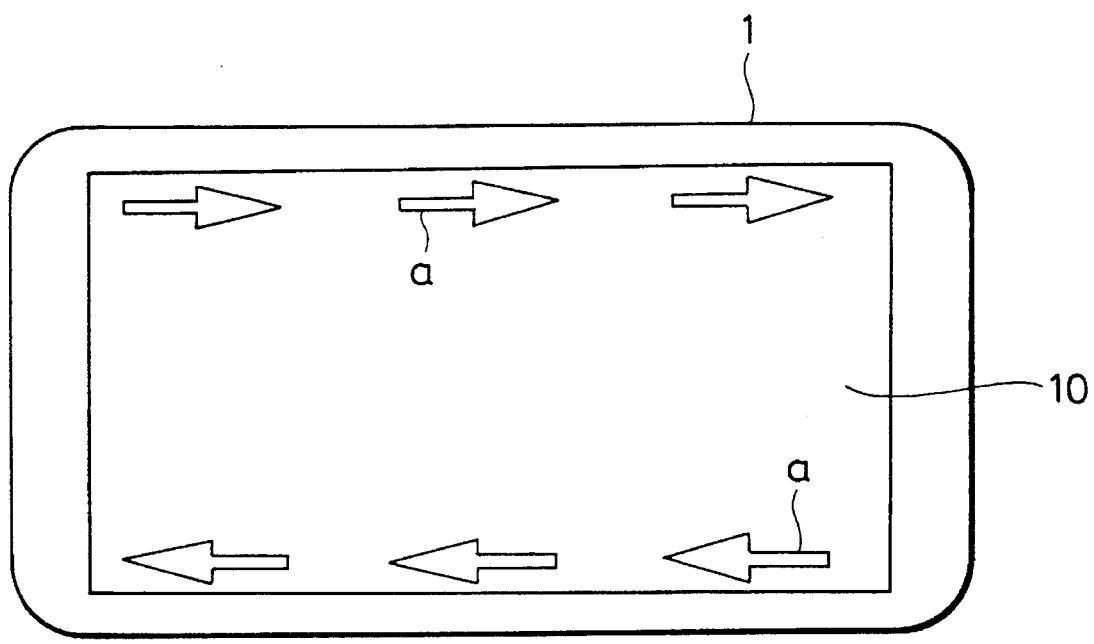
FIG. 6 is a diagram used to explain the landing state of an electron beam as seen from a picture screen.

Since the image rotation correcting coil 13 has the elliptical shape long in the vertical direction, the distribution of magnetic flux that is generated by the coil 13 is not uniform. Therefore, when a magnetic field is applied to the direction in which the electron beam advances, forces shown by arrows a in FIG. 6 act on the electron beam as seen from the picture screen 10 of the cathode ray tube with the result that the landing of the electron beam is corrected.

Further, if the coil 13 is disposed at the position in which there are no incorporated elements and parts such as the internal magnetic shield member or the like, i.e., the position between the deflection yoke 6 and the anode button 8, then the electron beam can be prevented from being moved in a complex fashion. Thus, the amount that the landing position of the electron beam is changed can be reduced.

Therefore, since the image rotation correcting amount and the landing correcting amount can be adjusted by changing the aspect ratio of the image rotation correcting coil 13 having the long shape in the vertical direction in accordance with the kinds of color cathode ray tubes, the image rotation correction and the landing correction can be performed by the single coil 13.

Experimental results of this landing correction will be described later.

According to the first embodiment of the present invention, the image rotation can be suppressed and the landing correction of the electron beam, particularly, the landing correction near the upper and lower ends of the picture screen can be effected by the image rotation correcting coil 13 having the long shape in the vertical direction, thereby improving the picture quality. Furthermore, when the image rotation is corrected, there is less picture distortion and misconvergence as a side effect of the image rotation.

Figure 7:
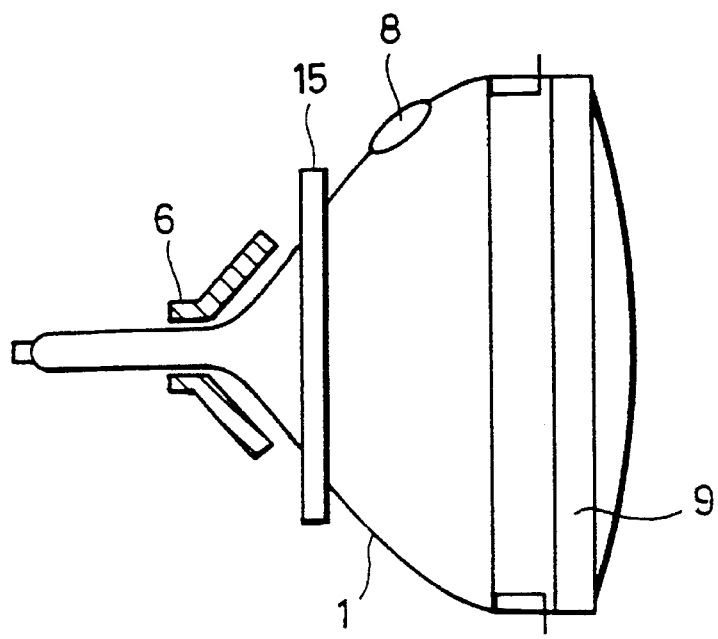
FIG. 7 is a side view illustrating the cathode ray tube according to a second embodiment of the present invention.
Figure 8:
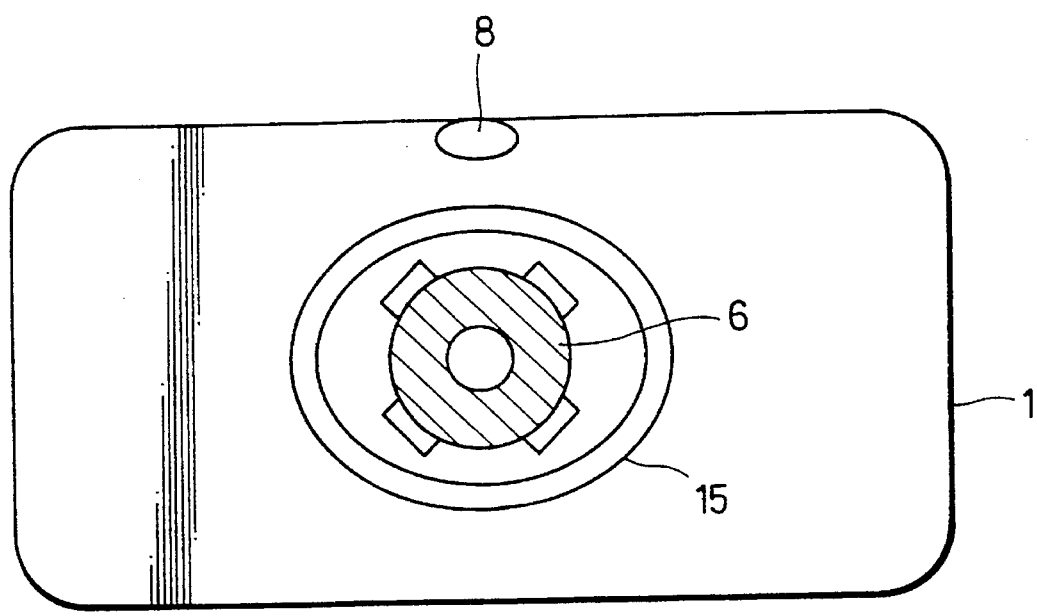
FIG. 8 is a rear view of the cathode ray tube shown in FIG. 7.

FIGS. 7 and 8 show a second embodiment of the color cathode ray tube according to the present invention.

In this embodiment, an image rotation correcting coil 15 having a long shape in the horizontal direction is disposed on the portion between the deflection yoke 6 disposed outside the funnel portion and the anode button 8 in such a manner that the coil surface thereof becomes parallel to the panel surface (so-called picture screen). The rest of the arrangement is similar to that of FIGS. 3 and 4 and therefore needs not be described in detail.

Figure 9:
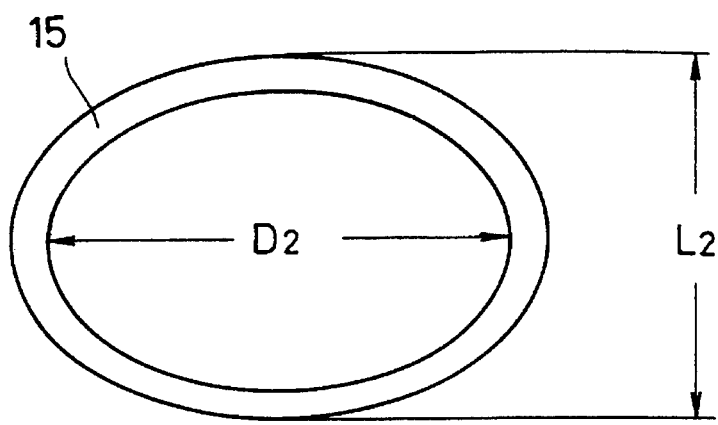
FIG. 9 is a front view illustrating an example of an image rotation correcting coil having a long shape in the horizontal direction.

As an example of the image rotation correcting coil 15 having the long shape in the horizontal direction, there is formed an elliptical coil having a long shape in the horizontal direction in which a conductor having a diameter of 0.2 mm is wound in 300 turns, a long diameter $D_2$ thereof becomes 280 mm and a short diameter $L_2$ thereof becomes 245 mm, as shown in FIG. 9.

The shape of the coil 15 is not limited to an ellipse having the long shape in the horizontal direction and the coil 15 can be formed of a rectangular coil having a long shape in the horizontal direction.

Also in accordance with this embodiment, when an electric current flows to the image rotation correcting coil 15 to generate a magnetic field in the opposite direction to the magnetic field (i.e., horizontal earth magnetism component in the north and south direction) that is perpendicular to the picture screen, a force opposite to the force caused by the earth magnetism acts on the electron beam, thereby suppressing the image rotation.

Further, since a uniform magnetic field is generated within the coil 15 by making the coil 15 compact in size, it is possible to remove bad influence such as image distortion or the like on the landing of the electron beam. Therefore, without exerting a bad influence on other elements and parts, only the image rotation can be corrected, strictly speaking.

Figure 10:
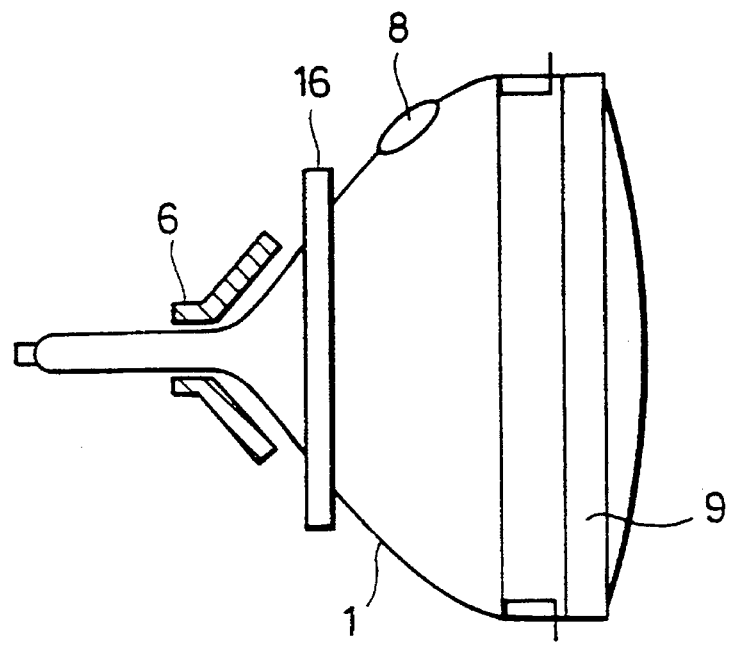
FIG. 10 is a side view illustrating the cathode ray tube according to a third embodiment of the present invention.
Figure 11:
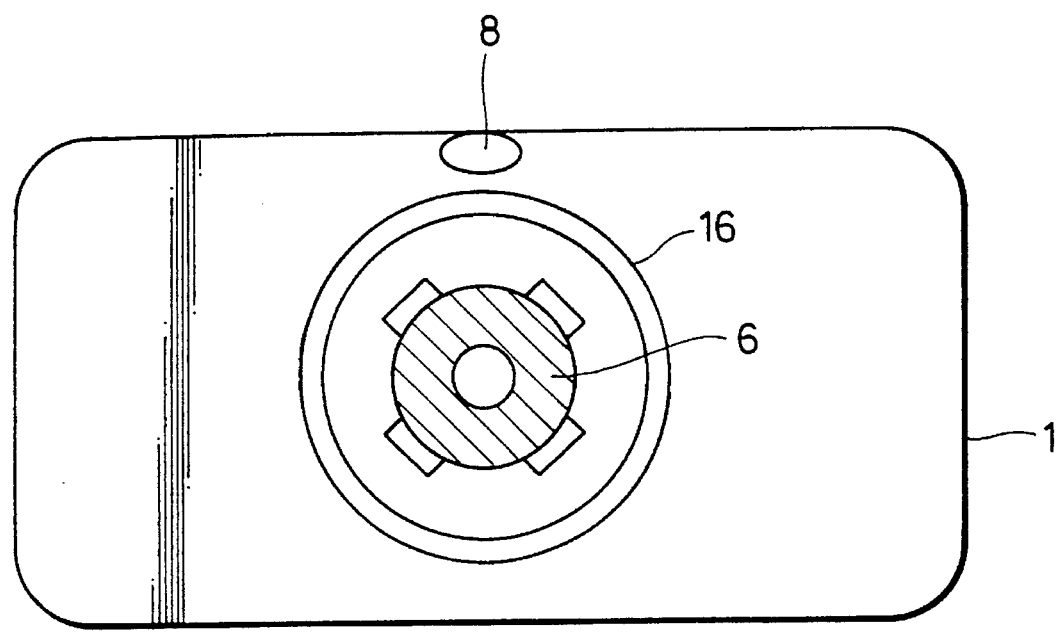
FIG. 11 is a rear view of the cathode ray tube shown in FIG. 10.

FIGS. 10 and 11 show a third embodiment of the present invention. In this embodiment, an image rotation correcting coil 16 of a true circle is disposed on the portion between the deflection yoke 6 formed on the outside of the funnel portion and the anode button 8 in such a manner that the coil surface thereof becomes parallel to the panel surface (so-called picture screen). The rest of the arrangement is similar to that of FIGS. 3 and 4 and therefore needs not be described.

Figure 12:
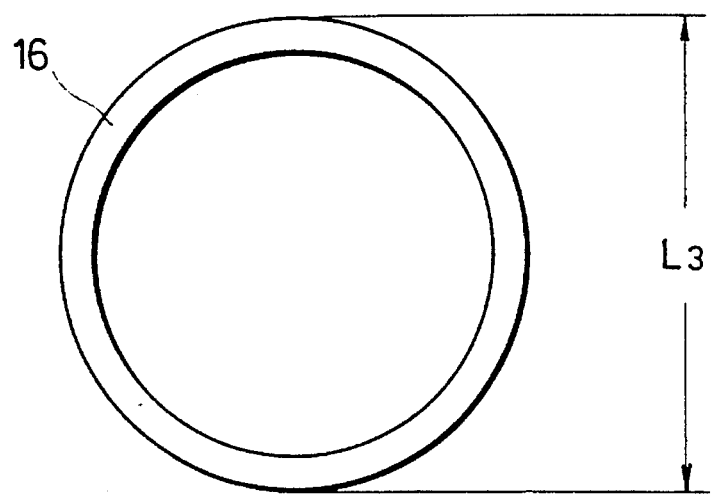
FIG. 12 is a front view illustrating an example of an image rotation correcting coil of a proper circle configuration.

As an example of the image rotation correcting coil 16 of a true circle, there is formed a circular coil in which a conductor having a diameter of 0.2 mm is wound in 300 turns and a diameter $L_3$ thereof becomes 263 mm as shown in FIG. 12.

In this case, the shape of the image rotation correcting coil 16 is not limited to the true circle and the coil 16 may be formed of a coil having a rectangular configuration.

Also in accordance with this embodiment, when an electric current flows to the image rotation correcting coil 16 to generate a magnetic field in the opposite direction to the magnetic field (i.e., horizontal earth magnetism component in the north and south direction) that is perpendicular to the picture screen, a force opposite to the force caused by the earth magnetism acts on the electron beam, thereby suppressing the image rotation.

Further, since the image rotation correcting coil 16 has the true circle shape, a uniform magnetic field is generated within the coil and can be prevented from affecting the electron beam landing such in image distortion or the like. Furthermore, the true circle coil 16 can reduce the amount in which the landing of electron beam is changed and can also correct the landing of the electron beam.

While the elliptical coil having the long shape in the longitudinal direction, the elliptical coil having the long shape in the horizontal direction, the true circle coil, and the rectangular coil are applied to the image rotation correcting coil as described above, the present invention is not limited thereto and a coil having a lozenge shape or the like can also be applied to the image rotation correcting coil of the present invention.

FIGS. 13A through 13G are schematic diagrams showing measured results of the image rotation corrected amounts and the changed amount of the landing when the image rotation correcting coil 13 having the elliptical shape long in the vertical direction is employed.

Initially, a magnetic field is set to zero to effect the degaussing. Then, the landing position of an electron beam is measured and set as a reference as shown in FIG. 13B. At that time, an image rotation is not yet produced. A straight line 21 in FIG. 13E shows the state in which no image distortion occurs yet.

Then, the cathode ray tube is directed to the north to effect the degaussing and the landing position is measured. FIG. 13C shows the landing pattern of the electron beam at this time. A straight line 22 in FIG. 13F shows the condition of an image rotation caused by the earth magnetism.

Under the condition that the cathode ray tube is directed to the north, a current flows to the image rotation correcting coil 13 having the elliptical shape long in the vertical direction (see FIG. 13A) to thereby correct the image rotation to the horizontal position to make the magnetic field zero (see a straight line 23 in FIG. 13G). Then, the change of the landing position is measured.

As a consequence, as shown in FIG. 13D, the elliptical coil 13 having the long shape in the vertical direction is suitable for correcting the image rotation because the landing pattern is moved in the direction so as to correct the landing pattern directed to the north shown in FIG. 13C.

Figure 14C:
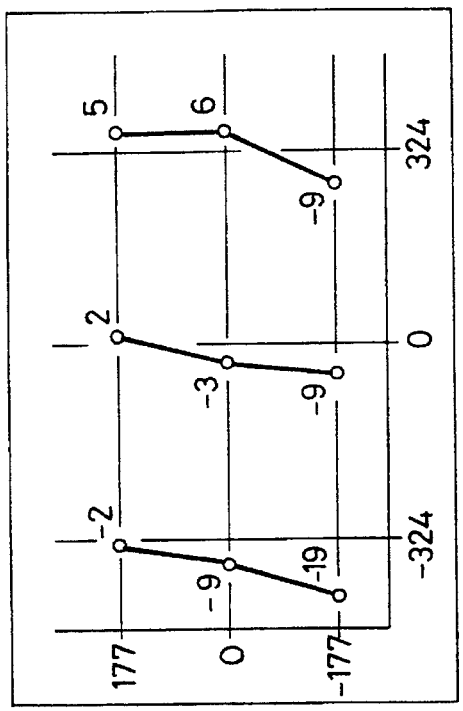
FIGS. 14A through 14C, FIGS. 15A through 15C, and FIGS. 16A through 16C are diagrams showing the landing patterns for which the electron beam is directed under control of the image rotation correcting coil having a long shape in the longitudinal direction, the image rotation correcting coil of the proper circle and the image rotation correction coil having the long shape in the horizontal direction, respectively.
Figure 14A:
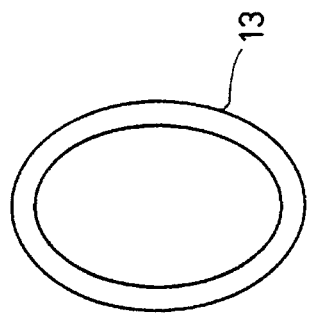
Figure 14B:
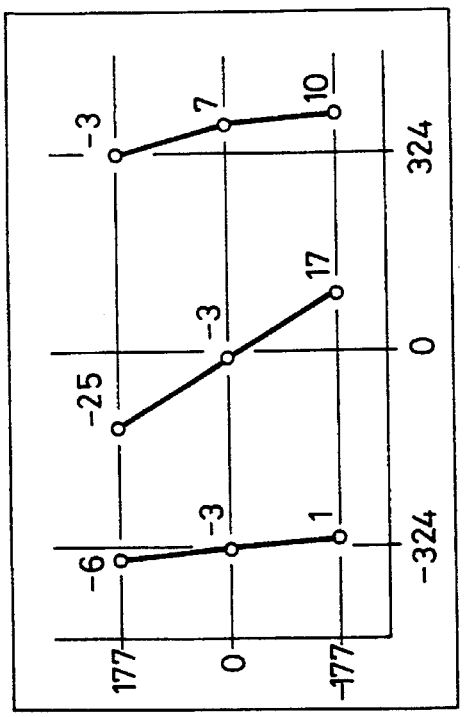
Figure 15C:
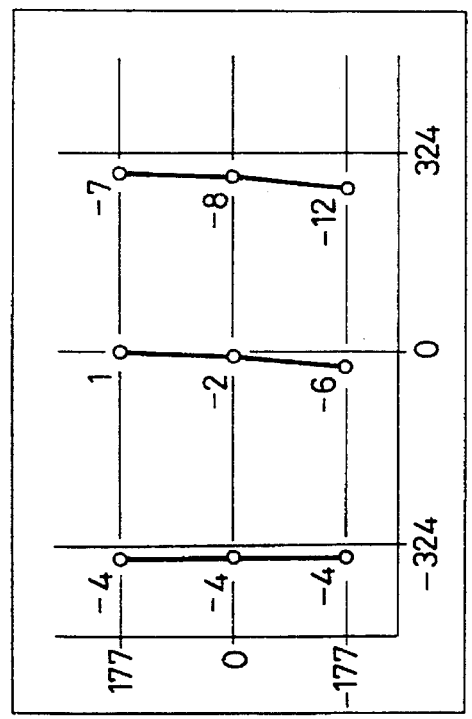
Figure 15A:
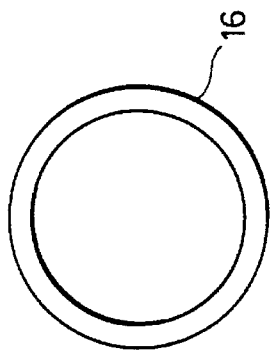
Figure 15B:
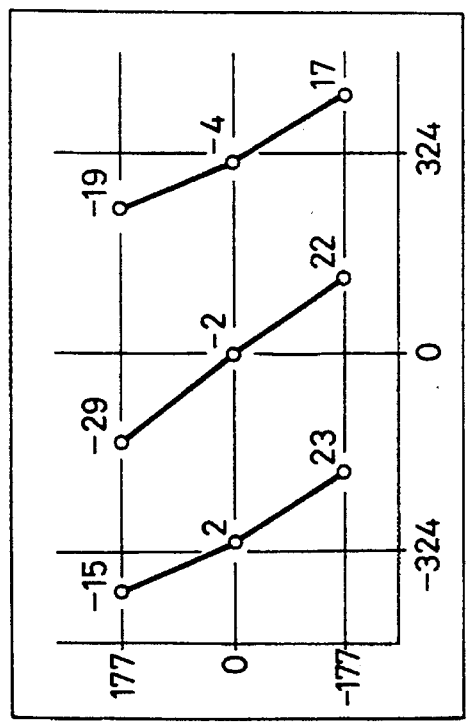
Figure 16C:
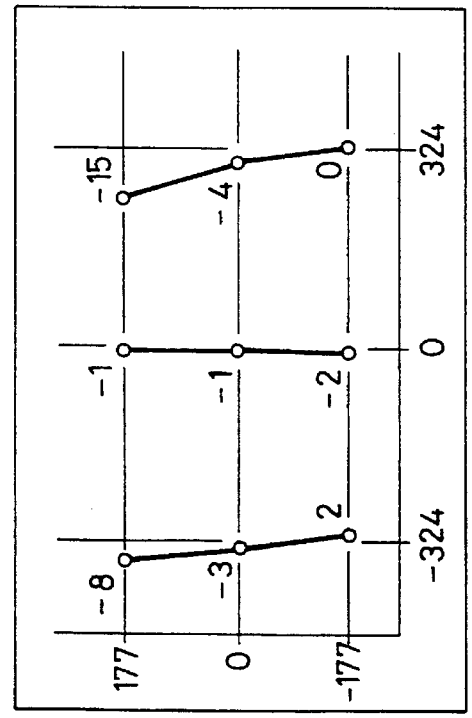
Figure 16A:
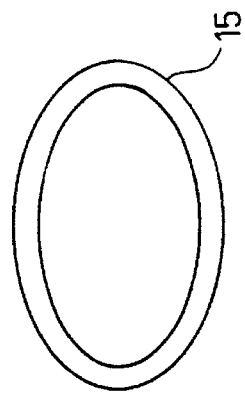
Figure 16B:
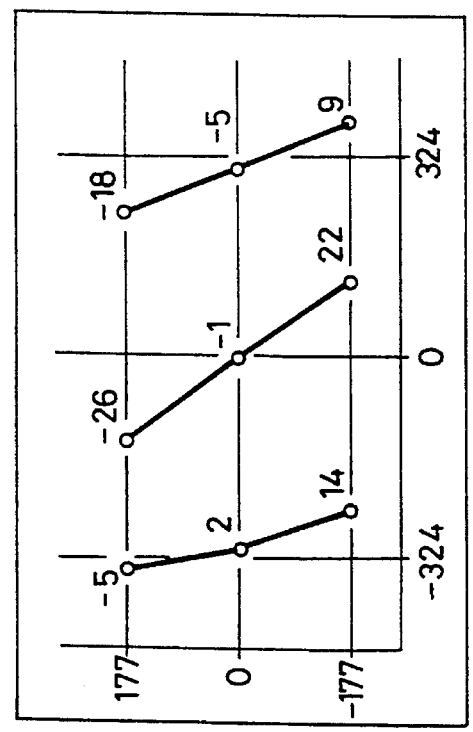
Figure 17:
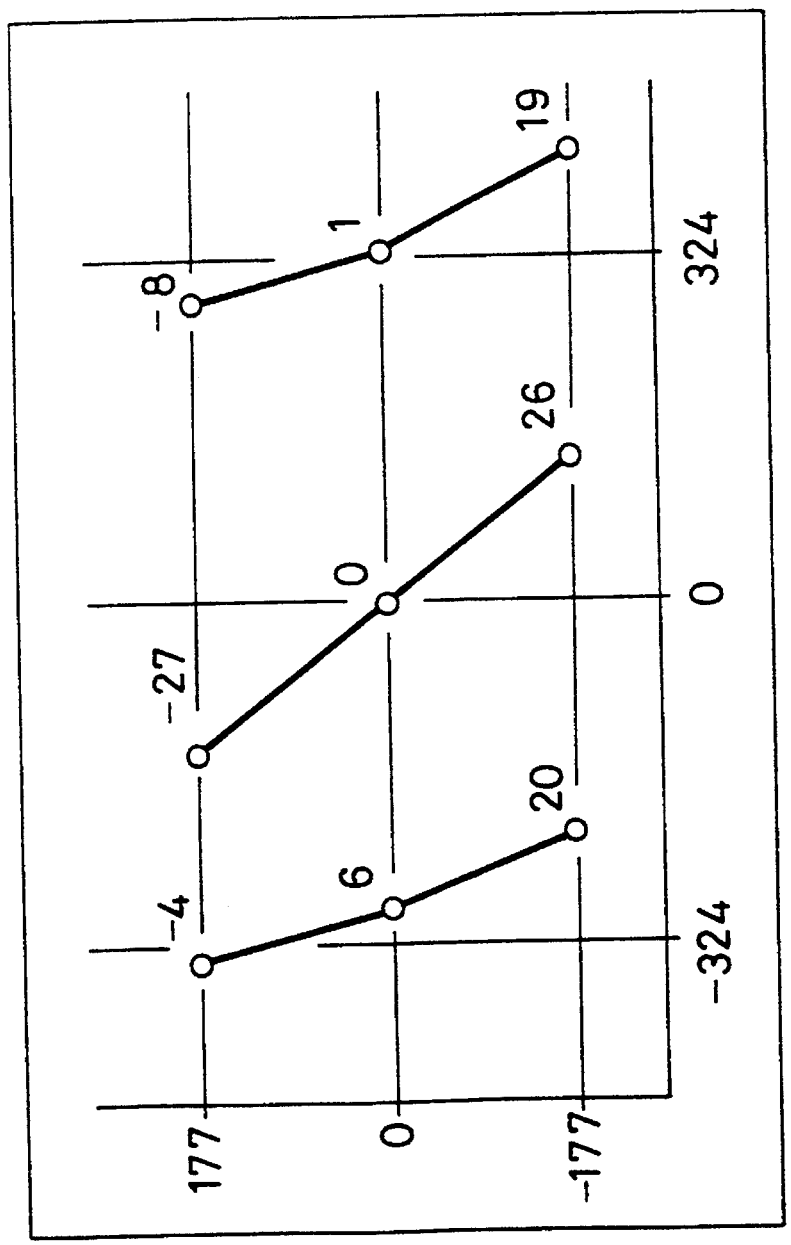
FIG. 17 is a schematic diagram showing the landing pattern more concretely.

FIGS. 14A to 14C, FIGS. 15A to 15C and FIGS. 16A to 16C show measured results of the changes of the landing positions of respective coil shapes. FIGS. 14A to 14C show the measured results concerning the similar elliptical coil 13 having the long shape in the vertical direction, FIGS. 15A to 15C show measured results concerning the true circular coil 16 and FIGS. 16A to 16C show measured results concerning the elliptical coil 15 having the long shape in the horizontal direction, respectively. FIG. 17 shows a landing pattern changed due to the influence of earth magnetism and illustrating the landing pattern of FIG. 13C more concretely.

FIGS. 14B, 15B and 16B show the changed amounts of landing positions measured when the image rotation is corrected up to the horizontal position having zero magnetic field. FIGS. 14C, 15C and 16C show differences between the respective landing position changed amounts (FIGS. 14B, 15B and 16B) and the landing position changed amount due to earth magnetism shown in FIG. 17, respectively.

Examination of the measured results reveals that the elliptical coil 13 having the long shape in the vertical direction is best for in landing correction because its landing correction amount (see FIG. 14C) operates in the direction to cancel earth magnetism drift.

On the other hand, considering the position at which the image rotation correcting coil is disposed, it is to be understood that, if the image rotation correcting coil is disposed behind the funnel portion, then the changed amount of the landing position can be reduced more as compared with the case in which the image rotation correcting coil is disposed ahead of the funnel portion. Consequently, it is considered that, if the image rotation correcting coil is disposed at the position in which the incorporated objects such as the internal magnetic shield member or the like are not provided, then an electron beam can be prevented from being moved in a complex fashion. Therefore, it is preferable that the image rotation correcting coil is disposed between the deflection yoke 6 and the anode button 8 as described above.

According to the present invention, the image rotation due to the external magnetic field in the direction vertical to the picture screen, accordingly, due to the horizontal component of the earth component of the north and south direction can be suppressed. In particular, when the coil having the long shape in the vertical direction is used, the landing correction can be satisfactorily carried out together with the image rotation correction. Thus, it is possible to provide a cathode ray tube having high picture quality.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A high definition television cathode ray tube comprising:
   a cathode ray tube assembly comprising a funnel, an electron gun for emitting an electron beam, a deflection yoke operating to deflect said electron beam, an anode button formed in said funnel and a display panel combined with said funnel; and
   a coil of wire formed in a plurality of turns having a current passed therethrough for generating a magnetic field acting on the electron beam and oriented to cancel an external magnetic field acting on the electron beam and caused by earth magnetism,
   said coil being disposed on the outside of said cathode ray tube assembly between said deflection yoke and said anode button at a position in which there are no elements on the inside of the cathode ray tube assembly for eliminating image rotation on said display panel caused by said external magnetic field of the earth magnetism, said coil further being elongated in a vertical direction relative to a horizontal scanning direction of the electron beam to cancel said external magnetic field.

2. A high definition television cathode ray tube as claimed in claim 1, wherein said magnetic field generated by said coil has a horizontal component.

* * * * *